United States Patent
DeBoer et al.

(10) Patent No.: US 7,593,322 B2
(45) Date of Patent: *Sep. 22, 2009

(54) APPARATUS AND METHOD FOR OPTICAL COMMUNICATION PROTECTION

(75) Inventors: Evert E. DeBoer, Nepean (CA); Darryl C. Ryan, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 715 days.

This patent is subject to a terminal disclaimer.

(21) Appl. No.: 11/038,206

(22) Filed: Jan. 21, 2005

(65) Prior Publication Data

US 2005/0122899 A1 Jun. 9, 2005

Related U.S. Application Data

(63) Continuation of application No. 09/620,248, filed on Jul. 20, 2000, now Pat. No. 6,934,248.

(51) Int. Cl.
*G01R 31/08* (2006.01)

(52) U.S. Cl. ........................ 370/225; 370/242

(58) Field of Classification Search ........................ None
See application file for complete search history.

(56) References Cited

U.S. PATENT DOCUMENTS

| | | | | |
|---|---|---|---|---|
| 5,537,393 | A | | 7/1996 | Shioda et al. ............... 370/16.1 |
| 5,646,936 | A | | 7/1997 | Shah et al. .................. 370/228 |
| 5,721,727 | A | | 2/1998 | Ashi et al. .................. 370/244 |
| 5,875,172 | A | | 2/1999 | Tabata ........................ 370/228 |
| 6,256,292 | B1 | * | 7/2001 | Ellis et al. .................... 370/227 |
| 6,282,170 | B1 | | 8/2001 | Bentall et al. ............... 370/225 |
| 6,331,905 | B1 | * | 12/2001 | Ellinas et al. ................. 398/2 |
| 6,366,556 | B1 | * | 4/2002 | Ballintine et al. ........... 370/216 |
| 6,567,194 | B1 | * | 5/2003 | Badr ............................ 398/1 |
| 6,606,427 | B1 | * | 8/2003 | Graves et al. .................. 385/17 |
| 6,636,529 | B1 | | 10/2003 | Goodman et al. ........... 370/469 |
| 6,934,248 | B1 | * | 8/2005 | DeBoer et al. .............. 370/217 |
| 7,173,930 | B2 | * | 2/2007 | Wellbaum et al. ........... 370/356 |

FOREIGN PATENT DOCUMENTS

EP 0 907 302 A2 7/1999

* cited by examiner

*Primary Examiner*—Phirin Sam
(74) *Attorney, Agent, or Firm*—Jeffrey M. Measures; Borden Ladner Gervais LLP

(57) ABSTRACT

Protection techniques within optical communication networks are extremely important. An alternative to a line protection scheme, as most current optical communication networks use, is to utilize a path protection technique in which working and protection paths that are desired are assigned during network setup. During normal operations, only the working path is configured within the network elements' switch fabric with protection paths being left unconfigured. If a failure indication is detected in the working path by a network element, a protection entry within a routing table of the network element is looked up to determine protection switching data that is required to switch the data traffic to the pre-assigned protection path. This protection switching data is inserted within the path overhead for the data traffic so that it can be communicated to all of the network elements that require their switch fabrics reconfigured to establish the protection path of communications. This protection technique allows for similar switching speed to that of line switching protection such as BLSR designs, but with an increase in efficiency in terms of protection bandwidth.

44 Claims, 10 Drawing Sheets

| A | B | C | D | E | F |
|---|---|---|---|---|---|
| DATA 2 WORKING | DATA 5 UNPROTECTED | DATA 1 WORKING | DATA 3 UNPROTECTED | DATA 4 WORKING | DATA 4 WORKING |
| DATA 3 UNPROTECTED | PROTECTION | PROTECTION | PROTECTION | UNASSIGNED | DATA 5 UNPROTECTED |
| PROTECTION | UNASSIGNED | UNASSIGNED | UNASSIGNED | | UNASSIGNED |
| UNASSIGNED | | | | | | ical communication network is a Bi-directional
APPARATUS AND METHOD FOR OPTICAL COMMUNICATION PROTECTION

RELATED APPLICATION

This application is a continuation of U.S. patent application Ser. No. 09/620,248 filed Jul. 20, 2000, in the name DeBoer, Evert E. et al, now U.S. Pat. No. 6,934,248.

FIELD OF THE INVENTION

This invention relates generally to optical communications and, in particular, to apparatus and methods used for protection of optical communications.

BACKGROUND OF THE INVENTION

Optical communication systems have become of critical importance within today's society. With this increase in importance comes a need for the optical communication infrastructures to maintain a high reliability and signal quality. To create these high standards, many techniques have been implemented. One extremely successful and wide spread method to maintain the integrity of communication networks, even during problem time periods, is through the use of line protection.

The key principle behind line protection within optical communication networks is the generation of working and protection channels for each communication link, the working and protection channels being physically identical in both bandwidth and functionality. In normal operations, with no faults indicated on either channel, the communication path is chosen to be through the working channel. The use of line protection allows communications that are traversing a working channel to be transferred to a protection channel when problems occur with respect to the working channel, with minimal interruption in the actual transmission of information. There are numerous different configurations for line protection systems that generally create a trade-off between the number of optical fibre cables (hereinafter referred to as Optical Carrier (OC) links) used and the level of protection that is required.

One of the simplest types of line protection is a 1:1 linear protection scheme, as depicted in FIG. 1A, in which each working channel between two Network Elements (NEs) has a corresponding protection channel in parallel with it. These working and protection channels can be within a single OC link, though preferably they are within separate links as shown in FIG. 1A. The separation of the working and protection channels into two OC links allows an alternate route for the communications in the case that the OC link containing the working channel is disabled. The disadvantage of having separate links for the working and protection channels is the significant cost the additional OC links can add to the optical communication network.

In some configurations of line protection, a number of working channels between NEs share a single protection channel, an example of such a configuration being shown in FIG. 1B. These configurations are referred to as 1:n protection schemes where n corresponds to the number of working channels that depend upon a single protection channel. In the sample configuration of FIG. 1B, n is equal to three. The advantage of these 1:n protection architectures is the reduction in the number of OC links that are required for implementation. The key disadvantage is the reduced level of protection that is established. For instance, with such a protection architecture, the failure of two or more working channels that correspond to a single common protection channel is not protected against and will result in a non-correctable failure if no other protection scheme is in place.

Another protection technique that is commonly used within an optical communication network is a Bi-directional Line Switched Ring (BLSR). Within a network that is connected with a BLSR protection scheme, the NEs that typically comprise add/drop multiplexers are connected in a series configuration that loops into a circle as depicted in FIG. 2A. Essentially, when configured into a BLSR, communications from any one NE in the ring to any other NE in the ring can be directed in either the clockwise or counter-clockwise direction. This allows for a completely independent path of communications in the case that an OC link and/or NE is disabled. Even in the BLSR design, each working channel in each direction is typically protected with a protection channel such that in essence communications being transmitted via a working channel has a number of transmission options in cases that the working channel is disabled.

Typical BLSR designs come in two varieties, those that comprise two optical fibre cables that are referred to as 2F BLSRs and those that comprise four optical fibre cables that are referred to as 4F BLSRs. In a 2F BLSR, there is a single OC link between each pair of NEs for each direction through the ring, each OC link typically having its bandwidth divided equally between working and protection channels. In a 4F BLSR, there are two OC links between each pair of NEs for each direction through the ring, one for the working channel in the particular direction and the other for the protection channel.

Since the protection level and budget requirements are different from network to network, a BLSR design must be flexible and allow for numerous modifications. Different BLSR designs allow for modified balances between the number of OC links used and the protection level provided. For instance, there are instances in which BLSR networks allow for data traffic beyond the bandwidth of the working channel, hereinafter referred to as extra traffic, to be transmitted on the protection channel rather than requiring a working channel of larger bandwidth. Further, some BLSR networks allow for communications between particular NEs to be unprotected, this unprotected traffic being transmitted within the working and/or protection channels but with lower priority such that, if the bandwidth used is required for other purposes or a failure occurs in the particular channel being used for the unprotected traffic, the transmission of the unprotected traffic can be discontinued without serious problems. Yet further, similar to linear line protection, some or all of the connections between NEs of a BLSR could be implemented with a 1:n protection architecture in order to reduce the number of protection OC links that are required.

Although these modifications allow for an adjustable configuration for the BLSR architecture, it is recognized that these modifications also add to the overall complexity of the optical communication network and therefore the difficulty to manage the network. This complexity is especially prevalent when considering combinations of more than one of the above modifications within a single BLSR. There are further difficulties with a BLSR architecture even when no modifications from the standard design are required, one of which is now described with reference to FIGS. 2A and 2B.

FIG. 2A illustrates a situation in which data traffic (DATA1) is being transmitted within a BLSR from a first NE 50, via second and third NEs 52,54, to a fourth NE 56. FIG. 2B illustrates the situation that occurs within the typical BLSR of FIG. 2A in the case in which a failure occurs within the OC link (containing both the working and protection channels) that connects the second and third NEs 52,54. As depicted in FIG. 2B, in the case of the failure between the second and third NEs 52,54, the data traffic (DATA1) being transmitted from the first NE 50 to the fourth NE 56 is re-routed around the failure. In a typical BLSR architecture currently used, this re-routing is done by sending the data traffic (DATA1) from the first NE 50 to the second NE 52, subsequently from the second NE 52, via first, fifth, sixth and fourth NEs 50,58,60,56, to the third NE 54, and finally from the third NE 54 to the fourth NE 56. Although this re-routing allows the maintaining of communications between the first and fourth NEs 50,56, the result of the line protection switching is a significantly inefficient use of the OC links between the first and second NEs 50,52 and between the third and fourth NEs 54,56. In both cases, the data traffic (DATA1) is double backing on its own path that decreases the available bandwidth within the effected OC links and further increases the time of transmission of the data traffic (DATA1) unnecessarily. This problem is caused by the fact that, in typical BLSR designs, when an OC link fails, all data traffic traversing the OC link is sent along the protection path corresponding to the failed OC link without consideration of the actual paths that the particular data traffic are traversing within the network.

There is a technique, referred commonly as transoceanic switching, that is occasionally utilized to remove the inefficiency described above while not moving away from a BLSR architecture. Transoceanic switching allows for the NEs at the start and end points for each data traffic path to be considered when re-routing data traffic after a working channel failure. This consideration essentially makes the line protection switching scheme of the BLSR into a combination between line protection and path protection architectures, reducing the inefficiencies associated with line protection while maintaining the standard BLSR framework. The problem with transoceanic switching, similar to the other possible modifications for a BLSR design, is the complexity that results from its implementation and the resulting difficulty in managing the overall network.

One technique that has been tried in order to remove the problems of BLSR designs and their numerous modifications that are commonly required is to move to a mesh protection design as illustrated in FIG. 3. In a full mesh design, each NE within a network is coupled to every other NE while in partial mesh designs, less OC links are utilized. The concept behind a mesh design is to establish working paths for all of the data traffic within the network while having a path protection strategy in place for any single failure. Within a well-known mesh design, when a failure occurs within a working path that has been established between two NEs, the network manager determines a new working path for the data traffic based upon the available bandwidth of the remaining OC links in the network. Well-known mesh techniques have an advantage in terms of minimizing the requirements for dedicated protection path bandwidth since the optical bandwidth used for protection is only assigned to the protection during a failure situation, hence reducing the cost of additional optical fibre cables.

One key problem with these well-known mesh designs is the amount of time that is required to locate and establish a new working path after a failure occurs. The time it takes to re-establish communications after failure is critical since the time period during switching should be small enough so as to be unnoticeable to the devices or people using the data traffic. In fact, the speed of protection switching is one of the primary advantages of the BLSR design described above, thus making the BLSR design extremely popular despite its problems with complexity when flexibility is added.

Hence, a new technique for protection switching within an optical communication network is required. Preferably, this new protection switching technique would have flexibility to adhere to specific customer requirements and would have somewhat comparable switching speeds to a standard BLSR design.

SUMMARY OF THE INVENTION

The present invention is directed to protection techniques within optical communication networks. Rather than using a line protection scheme as most current optical communication networks use, the present invention utilizes a path protection technique in which working and protection paths that are desired are assigned during network setup. During normal operations, only the working path is configured within the network elements' switch fabric, with protection paths being left unconfigured. The protection paths are assigned by having protection entries added to routing tables within the network elements of the working path. If a failure indication is detected in the working path, the network element detecting the failure looks up a protection entry within its routing table to determine protection switching modifications that are necessary to switch the data traffic to the pre-assigned protection path; performs the required change within its switch fabric; and inputs switching instructions within the path overhead of the data traffic so that these instructions can be transported to all required network elements. This process of pre-assigning the protection paths allows for similar switching speed to that of line switching protection such as BLSR designs, but with an increase in efficiency in terms of protection bandwidth.

The present invention, according to a first broad aspect, is a network element arranged to be coupled within a working path of an optical network. The network element includes a plurality of ports, a switch fabric and a control unit. The plurality of ports include first and second ports arranged to be coupled to Optical Carrier (OC) links within the working path. The switch fabric is connected to the plurality of ports and is configured to couple the first and second ports such that data traffic received on one of the first and second ports is output on the other. The control unit is connected to the switch fabric and operates to monitor for a failure within the working path. If a failure is detected in the working path, the control unit further operates to determine protection switching data corresponding to the failure and to insert the protection switching data within the data traffic being output from at least one of the first and second ports.

In preferred embodiments of the present invention, the network element according to the first broad aspect further includes a routing table that includes at least one protection entry. In this case, the control unit determines protection switching data corresponding to the failure by looking up a protection entry within the routing table corresponding to the failure within the working path, the protection entry comprising the protection switching data.

According to a second broad aspect, the present invention is a network element arranged to be assigned within a protection path of an optical network. The network element includes a plurality of ports, a switch fabric connected to each of the ports and a control unit connected to the switch fabric. The control unit operates to monitor for changes in protection switching data within data traffic received at one of the ports. If the protection switching data has changed, the control unit operates to process the protection switching data in order to determine if any switching instructions within the protection switching data relate to the network element and, if at least one of the switching instructions relate to the network element, to reconfigure the switch fabric according to the switching instruction related to the network element such that the network element is configured within a protection path of the optical network.

According to a third broad aspect, the present invention is a method for establishing an optical communication network of network elements and Optical Carrier (OC) links. The method includes configuring a working path for data traffic between a first path-terminating network element and a second path terminating network element via a first set of the OC links. Further, the method includes assigning at least one protection path for data traffic between the first network element and the second network element via a second set of the OC links. The assigning at least one protection path includes inserting protection entries into routing tables within network elements that can detect failures within the working path; the protection entries comprising protection switching data that indicates switch fabric modifications necessary to configure the protection path between the first network element and the second network element.

The present invention, according to a fourth broad aspect, is a method for configuring a pre-assigned protection path within an optical network during a failure within a pre-configured working path. The method includes monitoring for a failure indication within the pre-configured working path. Further, if a failure indication is detected within the working path, the method includes determining protection switching data corresponding to the failure, transporting the protection switching data within the data traffic to the network elements of the protection path and processing the protection switching data at each of the network elements that requires reconfiguration such that their corresponding switch fabrics are reconfigured.

According to a fifth broad aspect, the present invention is an optical communication network of network elements coupled together with Optical Carrier (OC) links. The optical communication network includes a working path and at least one protection path. The working path includes a first set of OC links and network elements that are configured to transmit data traffic between first and second path-terminating network elements. The protection path includes a second set of OC links and network elements that are assigned to transmit data traffic between the first and second path-terminating network elements if a failure is detected on the working path. In this aspect, routing tables within the network elements of the working path comprise a protection entry that dictates switching instructions that must be applied to the network elements of the protection path to configure the protection path.

In each of the above broad aspects, the data traffic preferably comprises a plurality of data units, each data unit comprising a path overhead that further comprises at least one protection byte. The at least one protection byte, in the case of a failure within the working path, having the protection switching data inserted. In exemplary embodiments of the present invention, each of the data units is a Synchronous Transport Signal Level 1 (STS-1) and the at least one protection byte comprises at least one of the Z3 and Z4 bytes defined within the path overhead of each STS-1.

According to a further aspect, the present invention is a data frame including a transport overhead and a Synchronous Payload Envelope (SPE). The SPE includes a path overhead and a payload. Protection switching data inserted within the path overhead. Preferably, the protection switching data is inserted within at least one of the Z3 and Z4 bytes within the path overhead and the data frame is one of a Synchronous Optical NETwork (SONET) frame and a Synchronous Digital Hierarchy (SDH) frame.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which.

DETAILED DESCRIPTION OF THE PREFERRED EMBODIMENT

The present invention is directed to methods and apparatus used to improve protection switching within a communication network. Essentially, the present invention is a modified technique for protecting data traffic traversing Optical Carrier (OC) links. Unlike the well-known BLSR and linear line protection architectures, the modified technique described hereinbelow is directed at a path protection architecture in which working and protection paths are initially assigned but only the working path is normally configured within switch fabrics of the NEs. In the case of a failure in the working path, a protection path is configured in order to transfer, and therefore maintain, the data traffic flow.

In some embodiments, as will be described herein below, the protection path that is selected to be configured in times of failure is determined based upon the type and location of the failure. In other embodiments, only one protection path is configured for use in times of failure.

The present invention is preferably designed to operate within the Synchronous Optical NETwork (SONET) standard, though it should be recognized that, as will be described herein below, other standards could be utilized such as the Synchronous Digital Hierarchy (SDH) standard. Prior to describing the specific modifications required to implement the present invention, a basic description of components and limitations for a typical network abiding by the SONET standard is provided in order to give a background of the environment in which the preferred embodiments of the present invention are implemented.

Figure 1A:
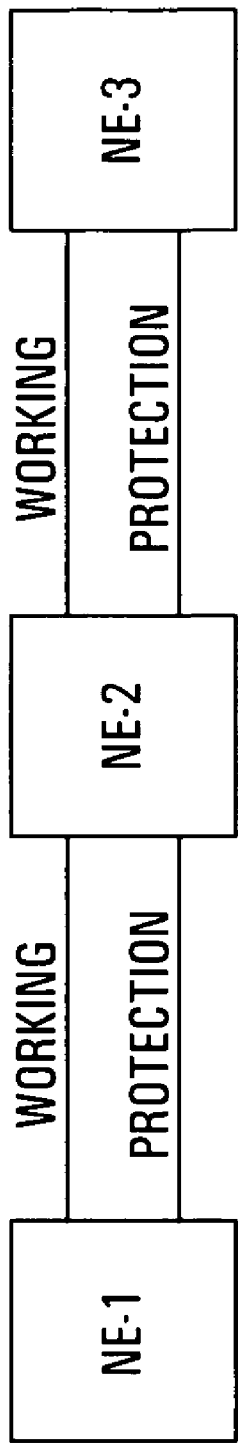
FIGS. 1A and 1B illustrate simple well-known linear line protection optical communication networks.
Figure 1B:
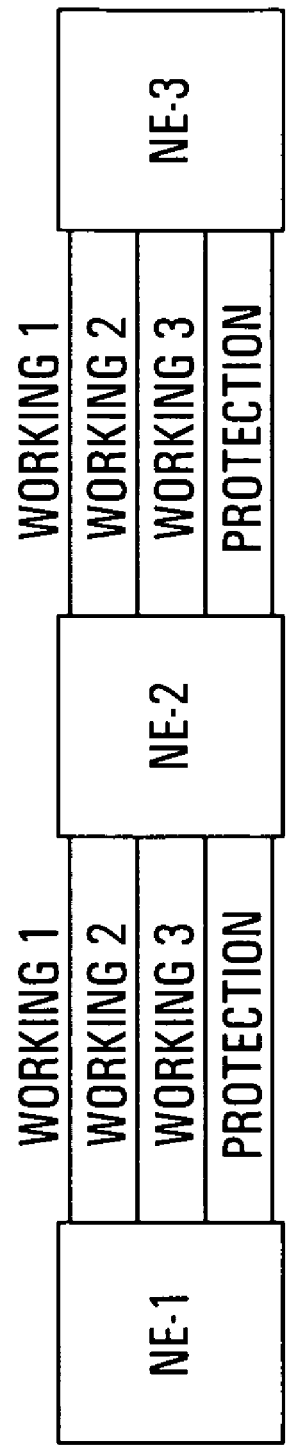
Figure 2A:
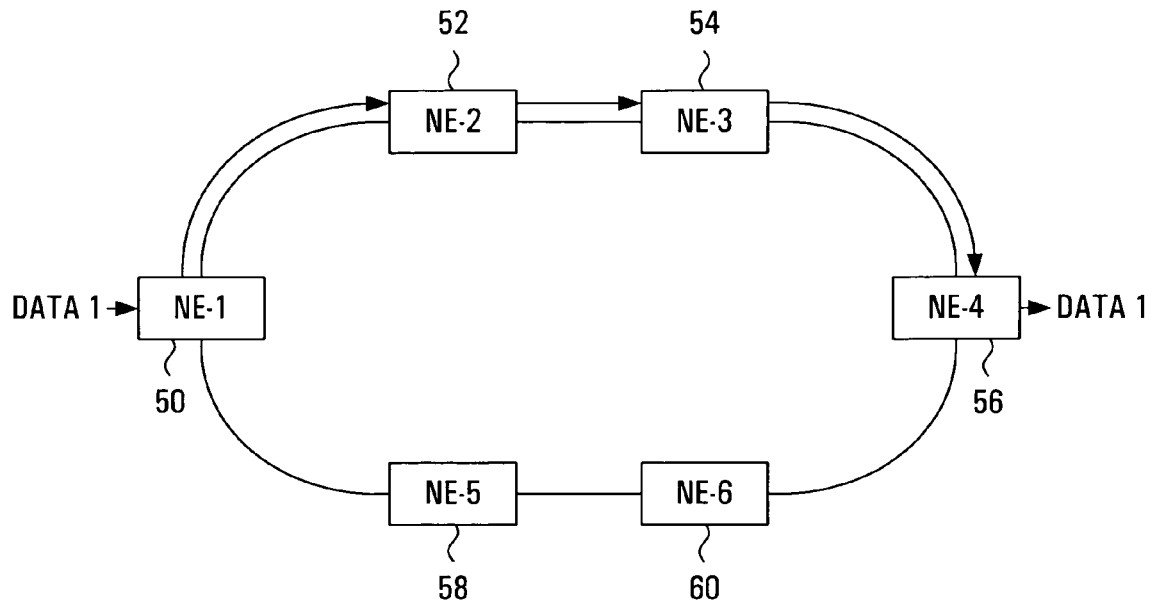
FIG. 2A illustrates a well-known Bi-directional Line Switched Ring (BLSR) that delineates a particular data traffic path during normal operations.
Figure 2B:
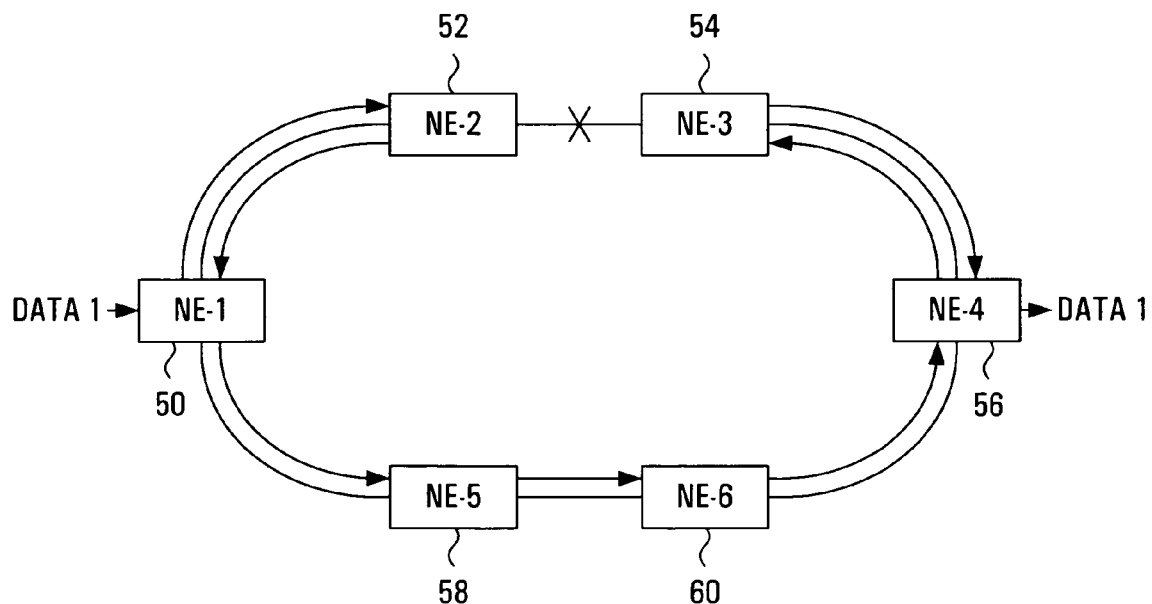
FIG. 2B illustrates the well-known BLSR of FIG. 2A that delineates a particular data traffic path during a failure operation.
Figure 3:
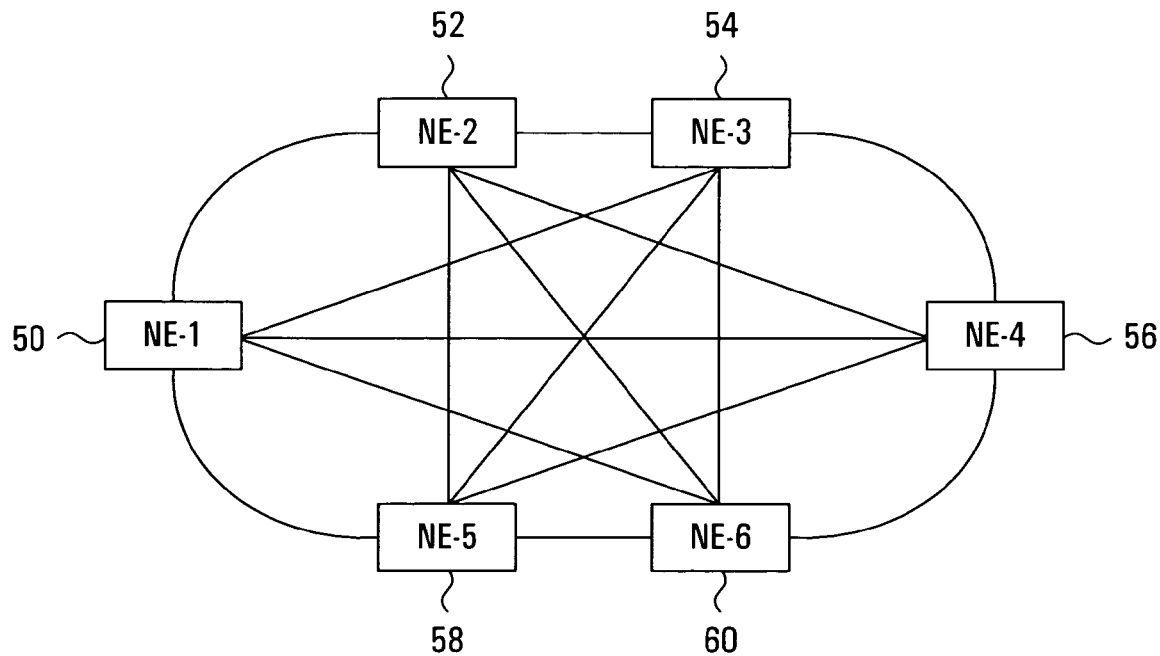
FIG. 3 illustrates a well-known mesh protection optical communication network.
Figure 4:
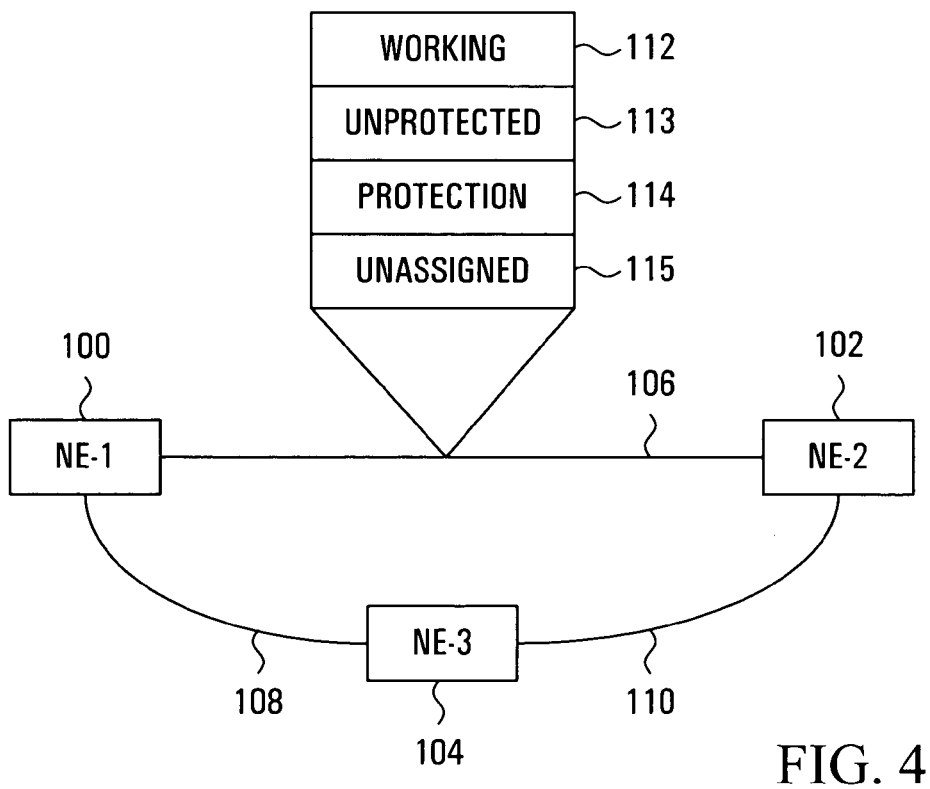
FIG. 4 illustrates a first sample optical communication network.

A sample SONET network is depicted in FIG. 4. As shown, this sample SONET network comprises a plurality of Network Elements (NEs) 100,102,104, each NE being a section, line and/or path terminating device such as, for example, an add-drop multiplexer, regenerator or digital cross-connect. In FIG. 4, the NEs 100,102,104 within this sample SONET network are interconnected by a plurality of OC links 106, 108,110 via which the NEs 100,102,104 are designed to transmit and receive data optically. As in any other SONET infrastructure, the majority of the transmission capacity available on each OC link of the SONET network of FIG. 4 is used to transport revenue-producing data traffic (payload) while some capacity (overhead) is set aside for managing and controlling payload transmissions. In embodiments of the present invention as will be described herein below, the payload within each OC link can be divided, as illustrated in FIG. 4, into a working channel sector 112, an unprotected channel sector 113, a protection channel sector 114 and an unassigned sector 115.

According to the SONET standard, each OC link 106,108, 110 in the SONET network of FIG. 4 can be designed to carry one or more SONET base signals. In SONET, a SONET base signal is referred to as a Synchronous Transport Signal Level 1 (STS-1) and is defined to operate at 51.84 megabits per seconds (Mbps). In conventional SONET systems, it is common to design OC links which can carry multiple STS-1 signals. Typically, the STS-1 signals are multiplexed together and form higher level signals which operate at integer multiples of the basic STS-1 rate. For example, three multiplexed STS-1 signals can be multiplexed to form an STS-3 signal that operates at three times the base rate of 51.84 Mbps or at 155.520 Mbps. Similarly, 48 multiplexed STS-1 signals can form an STS-48 signal which operates at 48 times the base rate of 51.84 Mbps or at 2.488 gigabits per second (Gbps). In more sophisticated configurations, OC links are designed to carry up to 192 multiplexed STS-1 signals and provide close to 10 Gbps of transport capacity. OC links which can carry 192 multiplexed STS-1 signals are typically referred to as OC-192 links.

In the SONET network of FIG. 4, the OC links 106,108, 110 can be designed to meet different capacity demands, but for purpose of example, the OC links 106,108,110 are hereinafter assumed to be OC-192 links which carry 192 STS-1 signals. It should be understood that the links 106,108,110 and all other OC links illustrated in other figures described herein below could alternatively be designed with lower transport capacities and carry less STS-1 signals if desired or even be designed with higher capacities should future transmission technologies allow such increases.

Figure 5:
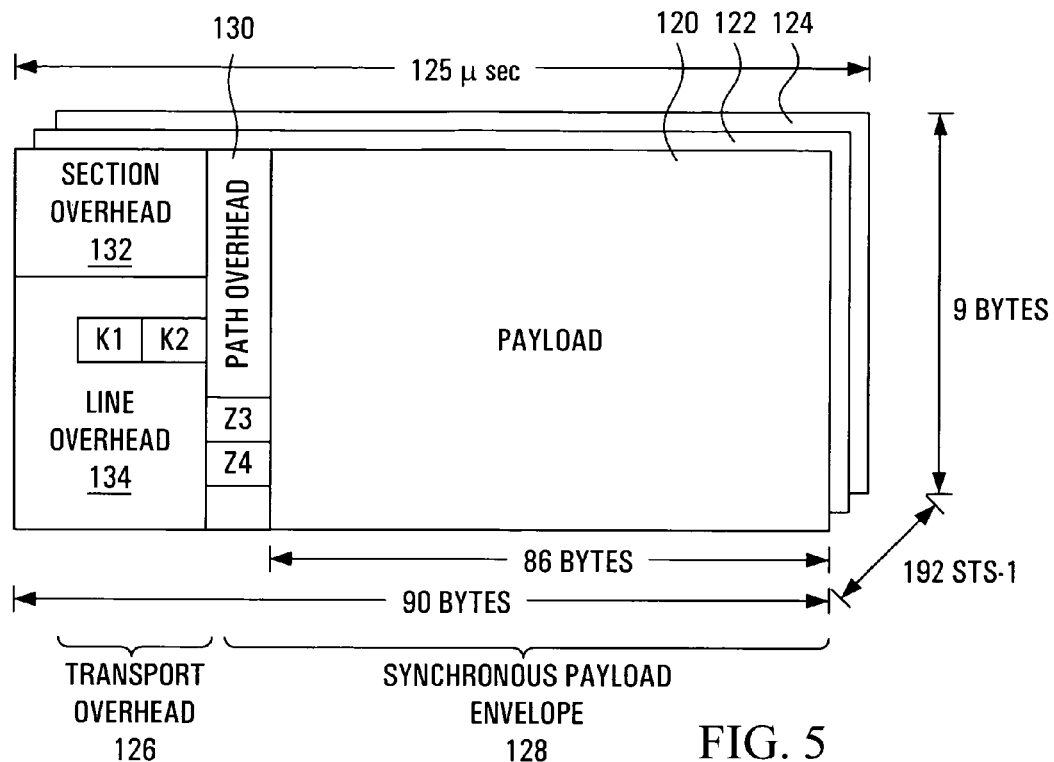
FIG. 5 illustrates an STS-N frame structure in accordance with the SONET standard.

For the transmission of STS-N signals, such as an STS-192 signal (N=192), SONET defines a standard STS-N frame structure which contains an envelope capacity for transporting payload data and various fields for overhead information. FIG. 5 shows an example of a standard STS-N frame as defined in SONET. The STS-N frame shown in FIG. 5 consists of N STS-1 frames 122,124,126 (only three shown) which, in SONET, are respectively numbered 1 to N. The number N of STS-1 frames 120,122,124 contained in the STS-N frame normally corresponds to the number of STS-1 signals carried in the STS-N signal. For instance, for an OC-192 link, the STS-N frame would consist of 192 STS-1 frames with each frame corresponding to one of the 192 STS-1 signals multiplexed.

In the STS-N frame, the STS-1 frames 120,122,124 are all identically structured in accordance with a standard frame format defined in SONET. Considering in particular the STS-1 frame 120, the STS-1 frame format defined in SONET is a specific sequence of 810 bytes or 6480 bits arranged in a 90-column by 9-row structure where each column contains 9 bytes and each row contains 90 bytes. According to SONET, the STS-1 frame 120 has a frame length of 125 µsec. With a 125 µsec frame length, 8000 STS-1 frames such as the STS-1 frame 120 can be transmitted each second. Considering that each STS-1 frame contains 6480 bits, the rate at which an STS-1 signal can be transmitted is given by:

STS-1 rate=6480 bits/frame*8000 frames/second;

=51.84 Mbps which, as noted above, is the base rate in SONET.

Considering the STS-1 frame 120 in more detail, the first three columns (columns 1 through 3) of the frame 120 are used for transport overhead 126 while the remaining columns (columns 4 through 90) define a Synchronous Payload Envelope (SPE) 128. The SPE 128 consists of 783 bytes and can be depicted as an 87-column by 9-row structure. The SPE 128 is predominantly used to carry payload data but the first column consisting of 9 bytes is allocated for a path layer overhead 130 (hereinafter referred to as the path overhead). The overhead bytes contained in the path overhead 130 are respectively labelled J1, J2, B3, C2, G1, F2, H4, Z3, Z4 and Z5. With the exception of the Z3 and Z4 bytes, the path overhead bytes are used for a variety of path control functions including signal performance monitoring and maintenance between path-terminating equipment. The Z3 and Z4 bytes do not currently have any specific control functions assigned and are set aside for user purposes in prior art situations. This is also true of every other Z3 and Z4 bytes present in each STS-1 frame 120,122,124 of the STS-N frame.

The transport overhead 126 is located in the first three columns of the STS-1 frame, these columns containing a total of 27 bytes. Of these, 9 bytes are allocated for section layer overhead 132 (hereinafter referred to as the section overhead) and 18 bytes are provisioned for line layer overhead 134 (hereinafter referred to as the line overhead). The section overhead 132 is located in rows 1 to 3 of the transport overhead 126 and is typically used to support section control functions including signal performance monitoring, administration, maintenance and provisioning between section-terminating equipment. The line overhead 134 is located in rows 4 to 9 of the transport overhead 126 and is typically used to support line control functions such as signal multiplexing, protection switching and maintenance between line-terminating equipment.

In the present invention, modifications are made within an optical network in terms of how the protection switching occurs. These modifications require changes within the SONET standard described above. In current line protection architectures, there are two bytes within the line overhead 134 in which protection switching data for the particular link is inserted in times of failure, these bytes being the K1 and K2 bytes illustrated in FIG. 5. The protection switching data provides the alternate path information that is required in the case of a failure within a particular OC link. In this case, if a failure occurs in a particular OC link, all data traffic traversing the OC link is redirected via a protection path specified by the K1 and K2 bytes, so that the data traffic still reaches the NE at the other end of the failed OC link. As described above, this protection path could be a protection OC link in parallel with the working OC link or, alternatively, the protection path could comprise numerous OC links that direct the data traffic in the opposite direction along a BLSR until it reaches the NE at the other end of the failed OC link.

In the present invention, the protection switching data is not inserted within the line overhead 134 but rather instead is preferably inserted during a failure within the path overhead 130. In particular, the protection switching data is preferably inserted within the Z3 and Z4 bytes that are currently not utilized by the SONET standard. Of course, alternatively, other bytes within the path overhead if redefined or included within a different standard could be used for a similar purpose.

The details of the protection switching data varies from embodiment to embodiment as will be described herein below, but the essence of the preferred embodiments of the present invention is the assignment of a protection path within the optical network during network setup and the insertion of protection switching data within the path overhead during a failure situation, this protection switching data indicating the necessary reconfiguring required to direct the data traffic along the assigned protection path. This protection switching data could be considered a trigger parameter for network elements that receive it since, upon a failure being detected within the working path, the processing of the protection switching data by the other applicable network elements of the optical network triggers the re-configuration of their switch fabrics in order to establish the protection path.

Figure 6:
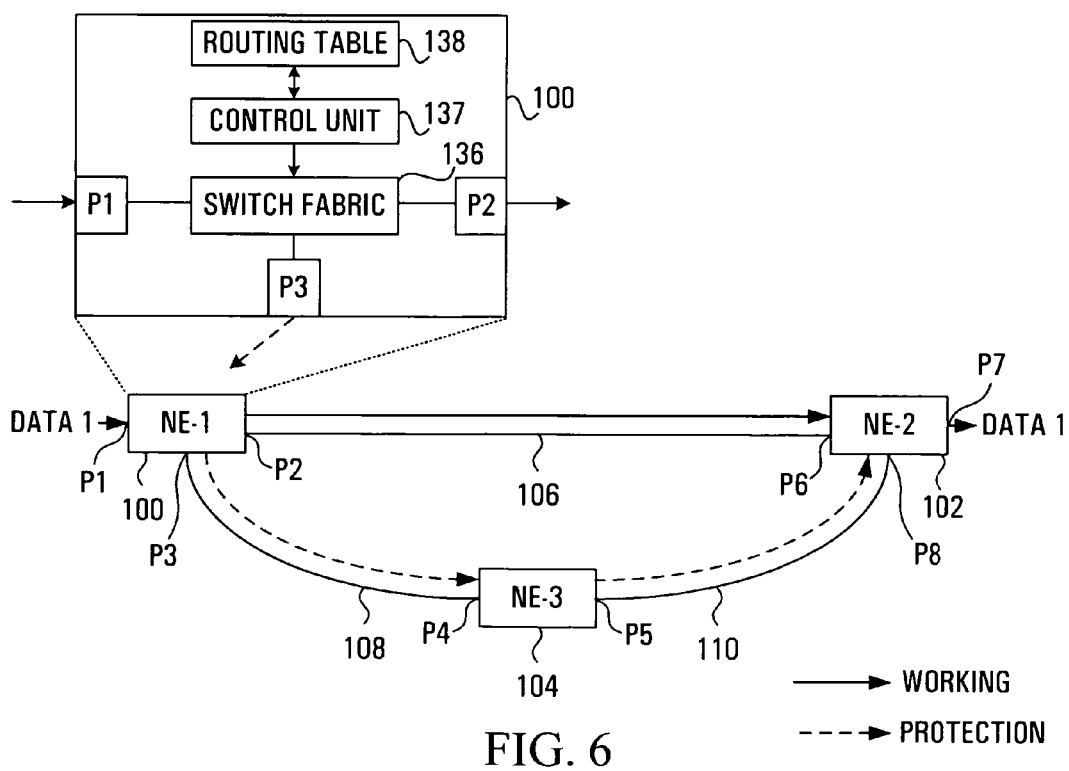
FIG. 6 illustrates the first sample optical communication network of FIG. 4 with particular working and protection data traffic paths delineated according to an embodiment of the present invention.

One simple embodiment of the present invention will now be described with reference to FIG. 6. In FIG. 6, the sample optical communication network of FIG. 4 is shown but with working and protection paths for data traffic DATA1 further delineated. As shown, the first NE 100 receives the data traffic DATA1 and forwards it to the second NE 102 via the OC link 106. The NEs 100,102 in this case are path-terminating devices with the OC link 106 constituting the working path for the particular data traffic. As shown in FIG. 6, the alternative path for transmitting the data traffic DATA1 is assigned to be from NE 100, via OC link 108, NE 104 and OC link 110, to NE 102.

As depicted within FIG. 6, NE 100, in this example, comprises ports P1,P2,P3 coupled to respective OC links; a switch fabric 136 coupled between each of the ports P1,P2,P3; a control unit 137 coupled to the switch fabric 136; and a routing table 138 coupled to the control unit 137. The operation of each of these components is described herein below in detail. It should be recognized that the other NEs 102,104 would have a comparable structure and, in fact, other NEs within further figures described herein below would preferably be of a similar structure according to the present invention.

Figure 7A:
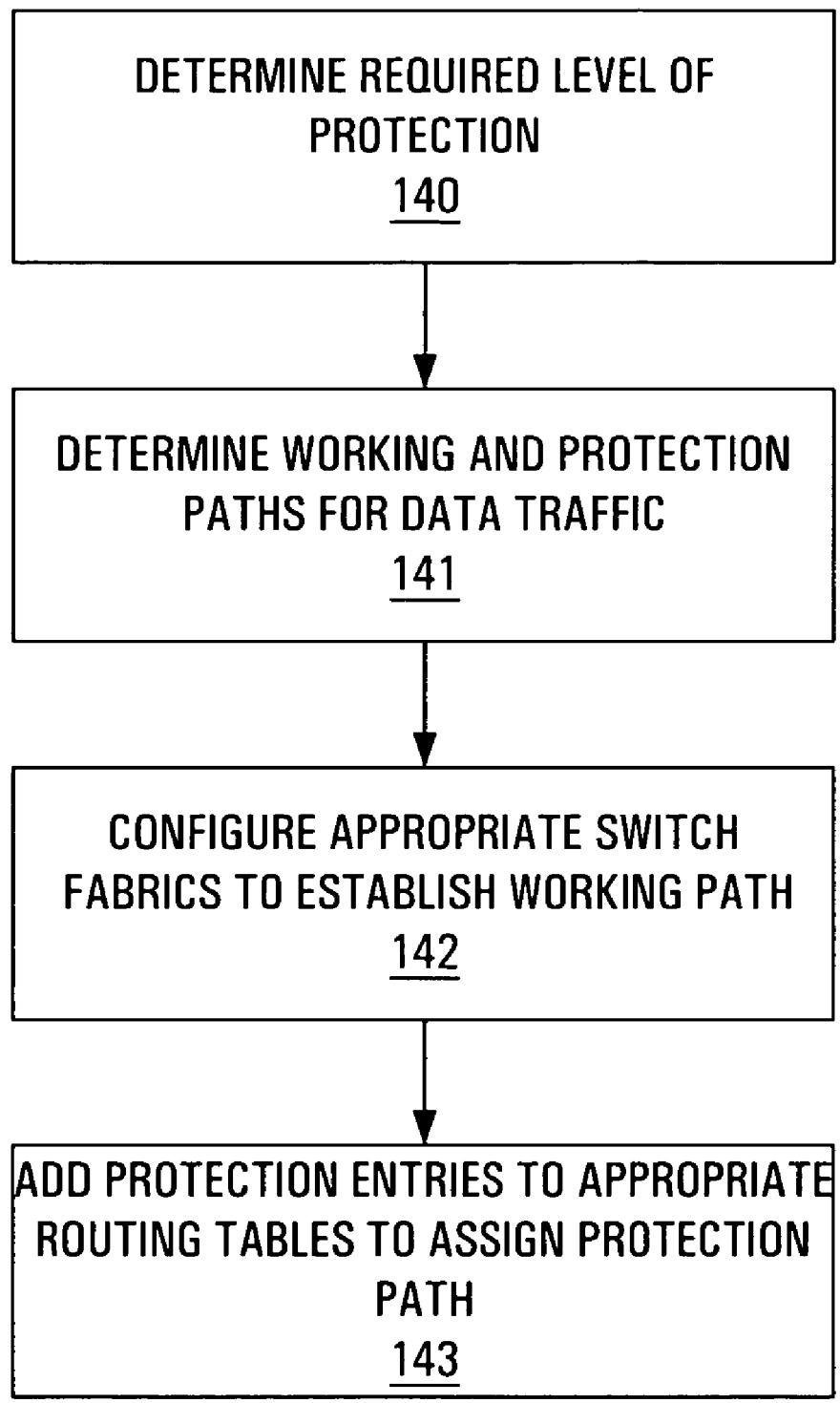
FIG. 7A is a flow chart illustrating the steps performed during network setup according to preferred embodiments of the present invention.

To establish working and protection paths according to preferred embodiments of the present invention, a process as described herein below with reference to FIG. 7A is followed. This process can be performed manually by a network manager or alternatively some of these steps could be performed automatically through the use of set algorithms as will be described herein below.

First, as depicted at step 140, the required level of protection for each data traffic path must be determined by the network manager, a number of different levels of protection being possible. Some of these levels of protection include, but are not limited to, 1:1 protection, 1+1 protection, unprotected traffic and 1:n protection. Each of these particular protection levels is described herein below by example. In the case depicted in FIG. 6, a 1:1 protection scheme has been selected for the data traffic DATA1.

The next step within the procedure to establish a network as depicted in FIG. 7A is to determine at step 141 the optimal OC links and NEs to be used for each of the working and protection paths that must be configured based upon the determined level of protection. This can either be done manually by the network manager, as long as the network manager is aware of the overall network's layout, or alternatively could be done automatically with the use of a routing method such as Dijkstra's algorithm. In the case of Dijkstra's algorithm determining working and protection paths for data traffic, ideally the most optimal shortest path found is chosen as the working path for the data traffic and the next most optimal shortest path is chosen as a protection path. It should be understood that other considerations such as load and cost of the particular OC links concerned could also have an affect on the paths chosen.

Once any working paths that are required have been chosen, the switch fabrics of the NEs concerned with the working path must be properly configured as depicted at step 142. The configuration of the switch fabrics within each NE dictates where particular data traffic will be routed. In particular, data traffic which arrives on a first port of a NE, that is connected to a second port through the switch fabric, will be output via the OC link corresponding to the second port. The combined effect of the switch fabrics' configurations is the defining of the OC links and NEs that are to be used if data traffic is received during working conditions on a particular port within a path-terminating NE.

Further, as depicted at step 143 within FIG. 7A, once any protection paths that are required have been chosen, entries within routing tables of the NEs that could possibly detect failures within the working path must be entered. That is, in order to assign a protection path within an optical communication network, the routing table within each of the NEs of the working path has a protection entry added. Each of these entries includes protection switching data that must be inserted within protection bytes of the path overhead once a particular failure occurs. This protection switching data indicates modifications that are required to be performed within the switch fabrics of the NEs included within the protection path in order to re-route the traffic.

In the present invention, the control unit within the NE that detects a failure in the working path determines which protection entry within the routing table must be applied to the switch fabric using via a look-up procedure. Subsequent to this determination, the control unit within the NE detecting the failure inserts protection switching data within the path overhead of the data traffic and, more specifically for preferred embodiments, within the Z3 and/or Z4 bytes that are currently not utilized. Further, if appropriate, the control unit of the NE detecting the failure reconfigures its switch fabric according to the protection switching data. For other NEs in the optical network, corresponding control units read the Z3 and/or Z4 bytes to determine if protection switching data is inserted. If there is protection switching data inserted (compared to default data), the control units process the data to determine if a reconfiguration of their particular switch fabric is necessary and, if necessary, how to reconfigure their switch fabric so that the protection path is configured.

In the sample optical communication network of FIG. 6, NE 100 has the switch fabric 136 configured such that, in normal operations, any data traffic received at port P1 is sent out via port P2 on OC link 106 and NE 102 has its switch fabric configured such that any data traffic received at port P6 from OC link 106 is to be output on port P7. Further, both NE 100, and NE 102 (the NEs of the working path) have their routing tables with a protection entry that indicates that, if a failure occurs within the working path (OC link 106), protection switching data indicated by the protection entry is to be inserted within the Z3 and/or Z4 bytes of the path overhead for this data traffic. The protection switching data in this sample case would include a protection switching instruction to reconfigure the switch fabric of NE 100 such that port P1 and port P3 are coupled together, a protection switching instruction to configure the switch fabric of NE 104 such that port P4 and port P5 are coupled together and a switching instruction to reconfigure the switch fabric of NE 102 such that port P8 and port P7 are coupled together. Using these configured switch fabrics, in normal operation, the data traffic DATA1 received at port P1 would therefore be output, via port P2, OC link 106, port P6 and NE 102, to port P7.

The operation of a control unit within a network element during the switching to a protection path is now described with reference to FIG. 7B. Initially, as depicted at step 144, the control unit is monitoring for any failure indications within any OC links that the NE is coupled using well-known techniques. In the case that a failure indication is detected for an OC link within a pre-configured working path, the control unit look-ups, as depicted at step 145, a protection entry within its routing table that corresponds to the particular failure that is detected. The protection entry indicates protection switching data comprising a number of switching instructions that must be performed within the optical network to configure the switch fabrics such that data traffic traverses the protection path. At this point, the NE inserts, at step 146, the protection switching data within the protection byte(s) in the path overhead of the STS-1 signals that comprise the data traffic. Within the protection switching data, it is possible that there is a switching instruction for the particular NE that detected the failure; this being determined at step 147.

If there is a switching instruction corresponding to the particular NE within the protection switching data inserted within the protection byte(s) at step 147, than a reconfiguration of the switch fabric according to the switching instruction takes place at step 148. The inclusion of a switching instruction corresponding to the particular NE indicates that the particular NE will be within the protection path. Once this reconfiguration of the switch fabric occurs at step 148 or if no reconfiguration is required at step 147 (indicating that the particular NE will not be within the protection path), the NE proceeds to output the data traffic with the protection switching data within the protection byte(s) at step 149 to the port dictated by the configuration of the switch fabric. At this point, the operation being performed by the control unit within the NE returns to step 144.

If at step 144 there is no detection of failures within any OC links in which the NE is coupled, the control unit monitors at step 150 for any changes within the protection byte(s) of incoming data traffic. When there are no failures within the working path, the protection byte(s) would be in a default state and, once a failure occurs within a working path, protection switching data is inserted to the protection byte(s) as described above with step 146. If there are no changes within the protection byte(s) of incoming data traffic, the procedure of FIG. 7B returns to step 144. Although the steps 144 and 150 are illustrated as separate steps in FIG. 7B, it should be understood that preferably these monitoring operations are continuously being performed by the control unit within each NE of the optical network.

If a change in the protection byte(s) is detected at step 150, the control unit proceeds to process, at step 151, the protection switching data inserted within the protection byte(s). At this point, the procedure being performed by the control unit proceeds to step 147 as described above in which a determination is made to whether there is a switching instruction within the protection switching data that corresponds to the particular NE. If there is a switching instruction that relates to the particular NE, the control unit proceeds to reconfigure the switch fabric according to the switching instruction. Whether there was a reconfiguration of the switch fabric or not, the control unit than outputs the data traffic including the protection switching data within the protection byte(s) to the port dictated by the configuration of the switch fabric.

Now, turning back to the example of FIG. 6, if a failure occurs within OC link 106, the NE 100 and/or the NE 102 would detect this failure. For simplicity, the case in which NE 100 detects the failure is the only situation that is described. As a result of detecting the failure, the control unit 137 within NE 100 would perform a look-up within the routing table to determine a protection entry that corresponds to such a failure (step 145). In this case, the protection entry would have protection switching data similar to that described above; the protection switching data including a switching instruction for each of NE 100, NE 104 and NE 102. Next, the control unit 137 would insert the protection switching data into the protection byte(s) within the path overhead of the data traffic DATA1 (step 146) and determine if any of the switching instructions related to the switch fabric 136 within NE 100 (step 147). In the case of FIG. 6, one switching instruction does correspond to the NE 100, that being the instruction to reconfigure the switch fabric 136 such that port P1 and port P3 are coupled together. Thus, the control unit proceeds to perform the instructed reconfiguration within the switch fabric 136 (step 148). After this reconfiguration is performed within NE 100, the data traffic DATA1 that is received at port P1 is subsequently output via port P3, this taking the data traffic with the protection switching data within the protection byte (s) of the path overhead via OC link 108 to NE 104 (step 149).

At this point, the NE 104 would receive the data traffic DATA1 at port P4 and detect the non-default protection byte (s) within the data traffic DATA1 (step 150). This results in the processing of the protection switching data within the protection byte(s) (step 151) and the determination that there is a switching instruction directed at the switch fabric of NE 104 (step 147), that being the instruction to configure the switch fabric such that port P4 and port P5 are coupled together. Next, the control unit of NE 104 would configure its switch fabric as per the instruction (step 148) and output the data traffic DATA1 via port P5 as configured by the switch fabric, resulting in the data traffic DATA1 being received at the NE 102 via OC link 110 (step 149).

Figure 7B:
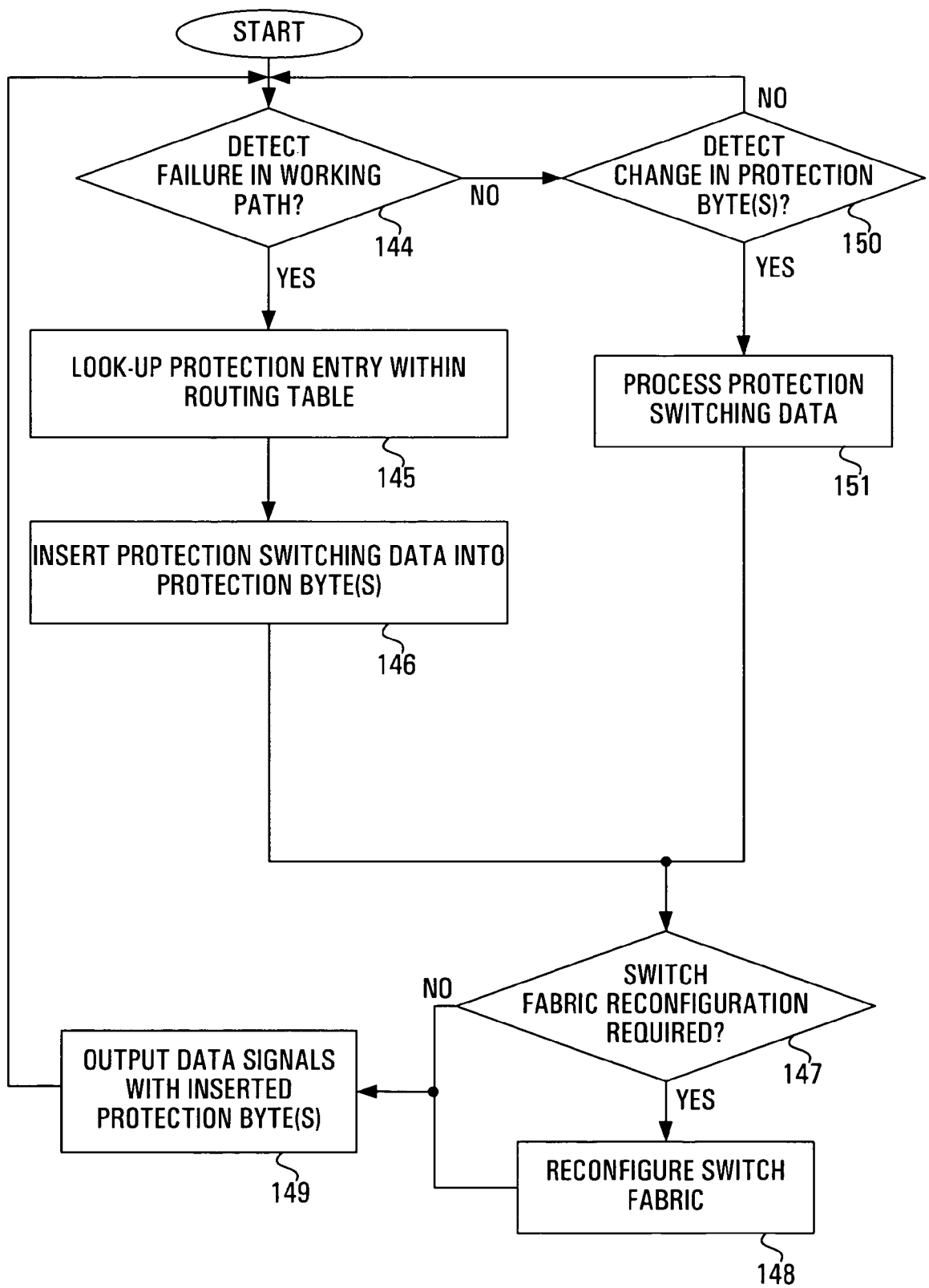
FIG. 7B is a flow chart illustrating the steps performed by a control unit within a network element during the switching to a protection path according to preferred embodiments of the present invention.

Further, similar procedures to that described above for NE 104 would be performed within NE 102 in order to reconfigure its switch fabric (steps 150, 151, 147, 148 and 149 within FIG. 7B). Alternatively, since the control unit within NE 102 could detect the failure in OC link 106 directly, the control unit of NE 102 could proceed through the steps similar to that described above for NE 100 (steps 144, 145, 146, 147, 148 and 149 of FIG. 7B). In the end, when a failure occurs on OC link 106, the data traffic DATA1 received at port P1 would be output, via port P3, OC link 108, port P4, NE 104, port P5, OC link 110, port P8 and NE 102, to port P7, this being the protection path selected in the previous step.

It should be recognized that in preferred embodiments of the present invention the working and protection paths are bi-directional paths. The example described above is specific to a unidirectional system simply for ease of explanation. Therefore, with the same configuration of a working path and assignment of a protection path, any data traffic received within NE 102 at port P7 would, during normal operations, be routed, via port P6, OC link 106, port P2 and NE 100, to port P1. Further, during a failure in OC link 106, the resulting reconfiguration of switch fabrics within NEs 100,102,104 would result in any data traffic received at port P7 being routed, via port P6, OC link 110, port P5, NE 104, port P4, OC link 108, port P3 and NE 100, to port P1.

It should be recognized that further port configurations and protection entries could be included within the switch fabrics and routing tables respectively of the NEs 100,102,104 for other data traffic paths not discussed. In essence, an entire optical communication network can be seen as numerous paths of communications that overlap NEs and OC links, each path with its own set of input and output ports being defined. In the example of FIG. 6, there is only the single communication path defined. In this case, both the working and protection paths are chosen during network setup and, to ensure protection is maintained, both the working and protection paths have reserved bandwidth. It is noted that, as will be described below, in some embodiments, the bandwidth reserved for the protection path is shared with protection paths of other communication paths while, in other embodiments, it is not.

In general, the paths that are included within an optical communication network according to the present invention can have any one of a number of different protection schemes and protection levels as are discussed below. In fact, with the use of the present invention, each of the paths could have a different protection coverage tailored specifically for the type and priority of data traffic that the path is to be used for, the availability of optical fibre cables and/or the client's desired configuration.

Figures 8A, 8B:
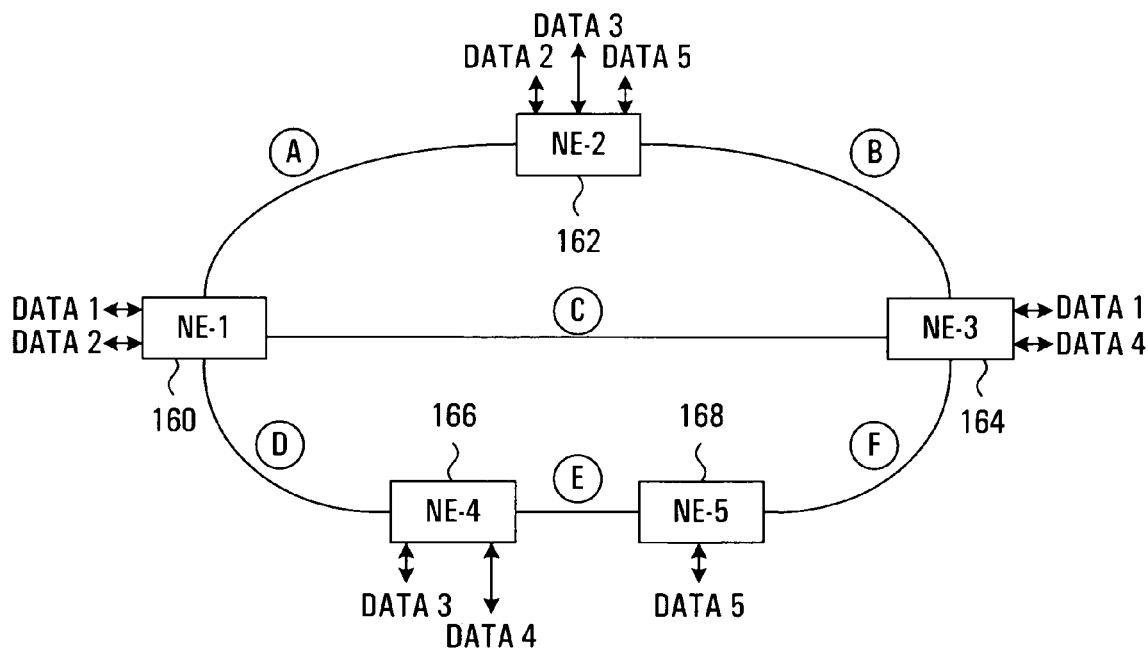
FIG. 8A illustrates a second sample optical communication network according to an embodiment of the present invention.
FIG. 8B illustrates the allocation of assigned bandwidth for the OC links within the second sample optical communication network of FIG. 8A.
Figure 9:
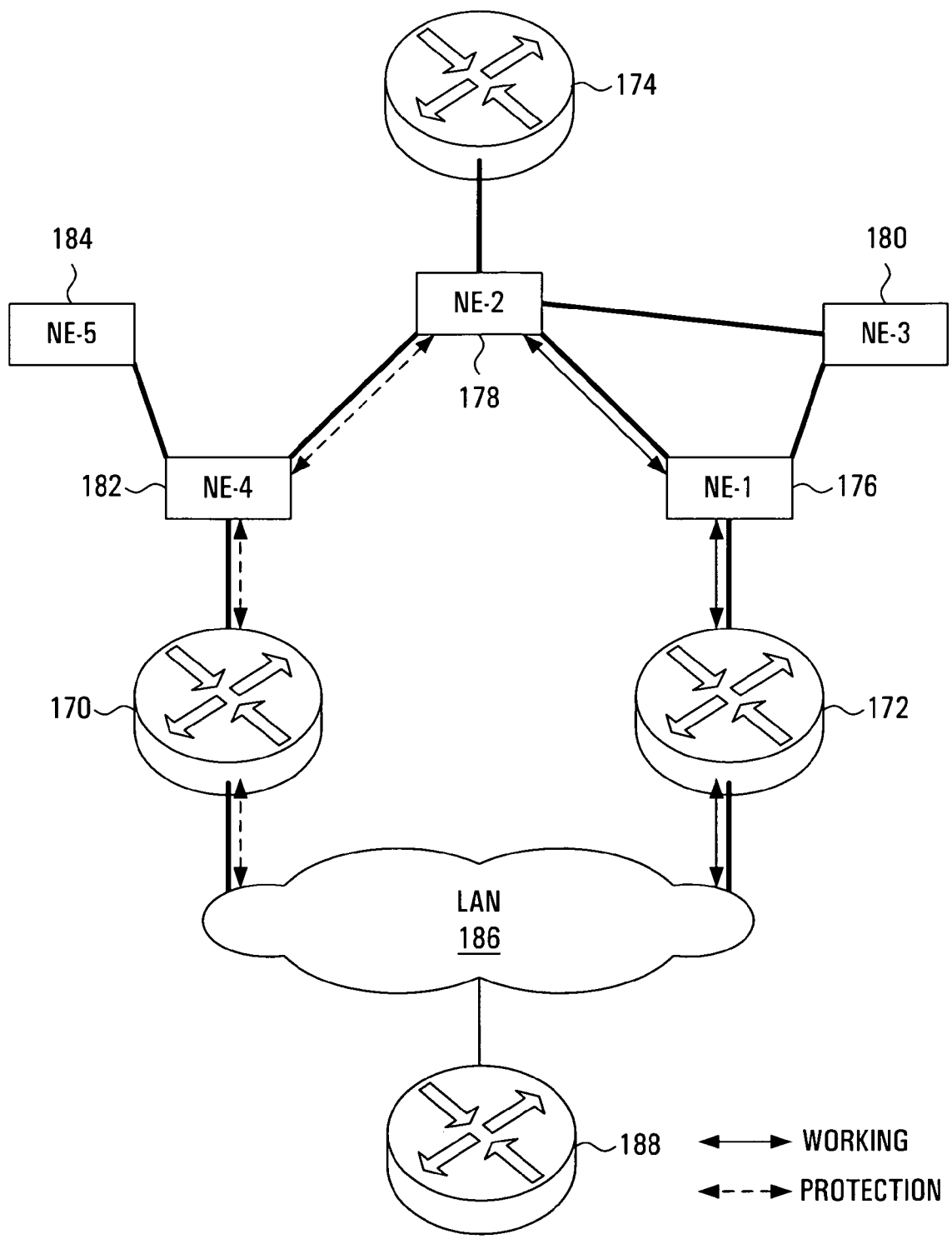
FIG. 9 illustrates a third sample optical communication network according to an embodiment of the present invention that delineates particular working and protection data traffic paths.

Prior to discussing more complex optical communication networks with reference to FIGS. 8 through 10, a number of different protections are now described. It should be noted that the description of the following protection schemes and levels is not meant to limit the scope of the present invention and, in fact, the flexibility of the present invention allows for a large number of different protection setups that are not discussed.

Some well-known protection schemes that are possible within an optical communication network according to the present invention are 1:1 protection as shown in FIG. 6, 1:n protection, and unprotected data traffic. Further, the network elements within the network could be configured within a ring, similar to the BLSR design, with each working and protection path within the ring being configured separately.

When considering the level of protection, an indication of the reservation of bandwidth allocation within the relevant OC links should be considered. As mentioned previously with reference to FIG. 4, an OC link can preferably be divided into a working channel sector 112, an unprotected channel sector 113, a protection channel sector 114 and an unassigned sector 115. In preferred embodiments of the present invention, the working channel sector 112 is a reserved portion of bandwidth that is used as part of one or more working paths; the unprotected channel sector 113 is a reserved portion of bandwidth that is used as part of one or more data traffic paths that have no protection paths; the protection channel sector 114 is a reserved portion of bandwidth that is required to ensure that bandwidth is available in case that a protection path must be configured; and the unassigned sector 115 is the remaining bandwidth that is available for other data traffic. Preferably, these reserved bandwidth sectors are saved within control software using well-known techniques.

Optical communication networks according to the present invention can be extremely flexible and therefore can balance the efficiency of the network with the protection of each individual data traffic path in a way that fits the situation. FIG. 8A illustrates a sample optical communication network in which the present invention could be implemented, this network comprising five NEs that are used to transmit data traffic along five data traffic paths. In FIG. 8A, a first NE 160 is coupled via OC link A to a second NE 162; the second NE 162 is coupled via OC link B to a third NE 164; the first NE 160 is coupled via OC link C to the third NE 164; the first NE 160 is coupled via OC link D to a fourth NE 166; the fourth NE 166 is coupled via OC link E to a fifth NE 168; and the fifth NE 168 is coupled via OC link F to the third NE 164. In this sample network, data traffic DATA1 is being transmitted between the first NE 160 and the third NE 164; data traffic DATA2 is being transmitted between the first NE 160 and the second NE 162; data traffic DATA3 is being transmitted between the second NE 162 and the fourth NE 166; data traffic DATA4 is being transmitted between the fourth NE 166 and the third NE 164; and data traffic DATA5 is being transmitted between the third NE 162 and the fifth NE 168.

FIG. 8B illustrates the bandwidth reservations within the OC links of FIG. 8A. In this example, data traffic DATA1 has a working path configured via OC link C and a protection path assigned via OC links A and B; data traffic DATA2 has a working path configured via OC link A and a protection path assigned via OC links C and B; data traffic DATA3 has an unprotected path configured via OC links A and D; data traffic DATA4 has a working path configured via OC links E and F and a protection path assigned via OC links D and C; and data traffic DATA5 has an unprotected path configured via OC links B and F.

In the example illustrated in FIGS. 8A and 8B, it can be seen that the protection sector within OC link A is reserved for the protection path of data traffic DATA1; the protection sector within OC link B is shared between the protection paths of data traffic DATA1 and data traffic DATA2; the protection sector within OC link C is shared between the protection paths of data traffic DATA2 and data traffic DATA4; the protection sector within OC link D is reserved for the protection path of data traffic DATA4; and OC links E and F do not have any reserved protection sectors. In the case of the shared protection sectors of OC links B and C, it should be noted that this implementation which includes shared protection sectors, only guarantees protection of a single fault within the optical communication network and so does not guarantee protection in the case that both data traffic protection paths that share a single reserved protection sector are both needed due to a plurality of faults within the network.

There are numerous techniques to address situations in which multiple faults occur within an optical communication network similar to that illustrated in FIG. 8A. For one, a priority hierarchy could be established for different protection paths. For instance, in the case that the protection sector within OC link C is required for both the protection paths of data traffic DATA2 and data traffic DATA4 due to faults within OC links A and F, the protection path of data traffic DATA2 could take priority. The priority could simply be based upon the order in which the faults occur or alternatively could be based upon the type or importance of the data being transmitted. Additionally, even if the protection sector is being utilized by a first protection path when it is needed for a second protection path, the second protection path could alternatively be configured within an unassigned sector of the OC link, assuming the unassigned sector has sufficient bandwidth. In the example implementation of FIGS. 8A and 8B, all but OC link A would likely have sufficient bandwidth within the unassigned sector to accommodate additional protection bandwidth that exceeds that included within the protection sector.

Yet further, one additional solution to the problem of shared protection sectors in the case of multiple faults is to have larger protection sectors in the case that a protection sector is being shared. A disadvantage of this solution is the increased amount of reserved bandwidth resources that are required, though this may be necessary if 1:1 or 1+1 protection must be guaranteed. Another solution to this problem is to have a second protection path assigned for a particular communication path in the case that the first protection path cannot be configured. A disadvantage of this solution is the increased complexity and increased bandwidth resources that are required in cases of multiple protection paths for a single working path.

In the example illustrated in FIGS. 8A and 8B, data traffic DATA3 and data traffic DATA5 only has unprotected data paths, presumably because this data traffic is of low priority. In some embodiments of the present invention, despite an unprotected path not having a reserved protection bandwidth within OC links, there is still the option of having a protection path assigned during network setup. In this case, assignment of the protection path would include the insertion of protection entries within the routing tables of the NEs affected as described above, but would not include having the capability to use bandwidth within the reserved protection sectors of OC links. Only any bandwidth within the unassigned sectors of the associated OC links could be used in cases of a failure within the unprotected path.

Within FIG. 8B, although the bandwidths corresponding to the OC links are the same, one should understand that this is meant to illustrate a simple example. In other embodiments, OC links within an optical network would likely have various bandwidths. Further, within FIG. 8B, although the bandwidth requirements for each set of data traffic is illustrated as the same, one should understand that the bandwidth requirements for different data traffic would likely be different. The protection sector reserved in a particular OC link is preferably of sufficient bandwidth to protect the corresponding working path that has the greatest bandwidth requirements.

FIG. 9 illustrates an optical communication network that demonstrates additional flexibility that is available with the use of the present invention that is not available with traditional protection techniques, that being the ability to reconfigure optical paths that only make up a portion of the overall data path in cases of failures within the optical working path. In particular, if a service access point fails, previous protection techniques would not be able to correct for the failure while, as described below, it may be possible with the use of the present invention depending upon the circumstances.

As illustrated in FIG. 9, four routers 170,172,174,188 and five NEs 176,178,180,182,184 are shown interconnected within an optical communication network. As depicted in FIG. 9, NE 176 is connected to NE 178, NE 180 and router 172; NE 178 is further connected to NE 180, NE 182 and router 174; and NE 182 is further connected to NE 184 and router 170. Yet further, routers 170, 172 and 188 are independently connected to Local Area Network (LAN) 186. In the sample situation illustrated in FIG. 9, a working path is configured between router 188 and router 174 via LAN 186, router 172 and NEs 176,178. In this situation, if a service access point such as NE 176 fails, the remaining components of the optical network cannot by themselves compensate for the failure.

In an embodiment of the present invention, a protection path could be assigned during network setup for such a failure if the network manager is aware that router 188 could transmit/receive data traffic via LAN 186 to/from router 170. In this case, an overall protection path could be assigned between router 188 and router 174 via the LAN 186, router 170, NE 182 and NE 178 if some form of higher layer protection scheme is in place for the data traffic to be transmitted via router 170 in the case of a failure. On the higher layer, this could be done by having a constant connection between router 170 and router 188 along with the working path connection between router 172 and router 188 or alternatively could be done by having another form of protection that connects routers 170,188 in times of failure.

As long as there is a technique for having routers 170,188 connected during a failure situation, the NEs of FIG. 9 can compensate for a failure within NE 176 by establishing a protection path between router 170 and router 174. This can be done by inserting protection entries within NEs 176,178 that include protection switching data for reconfiguring the switch fabrics of NEs 178,182 appropriately in case of failure.

In this situation, if NE 178 detected a failure within NE 176, the control unit within NE 178 would perform a look-up within its routing table to determine a corresponding protection entry, the protection entry including protection switching data with a switching instruction for NE 178 and a switching instruction for NE 182. The control unit within NE 178 would then insert the protection switching data in protection byte(s) within the path overhead of the data traffic, reconfigure its switch fabric as per the switching instruction and output the data traffic received from router 174 to NE 182 (as per the reconfiguration within its switch fabric). The control unit within NE 182 would than detect the non-default protection byte(s) that it receives within the data traffic, process the protection switching data within the protection byte(s), reconfigure its switch fabric based upon the corresponding switching instruction and output the data traffic to the router 170. Assuming that the routing between router 172 and router 188 has been switched (or duplicated) between router 170 and router 188, router 188 and router 174 could then communicate via the overall protection path. In previous mesh configurations, an attempt to reconfigure the optical communication network of FIG. 9 would not consider components beyond the NEs of the optical communication network.

In exemplary embodiments of the present invention, the type and location of the failures within the working path indicates the protection path that will be utilized. This is done by having different failures within the network resulting in different protection entries (and hence protection switching data) within the routing tables being found.

FIGS. 10A through 10D illustrate an optical communication network that has a data traffic path with a protection scheme according to this exemplary embodiment of the present invention. In this case, a working path exists between NE 200 and NE 208 via NEs 202,204,206 and protection paths exist between NE 200 and NE 208 via NEs 210,212, 214,216,218, via NEs 202,204,214,216,218 and via NEs 210, 212,214,204,206.

Figure 10A:
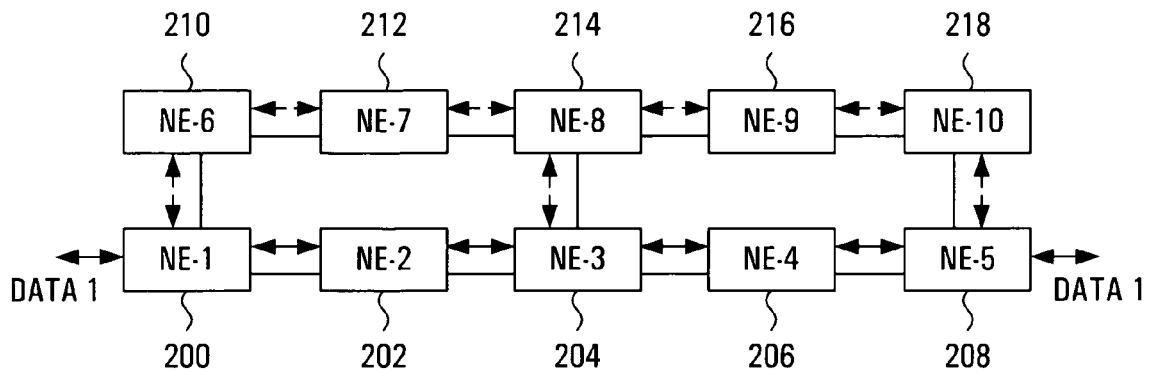
FIG. 10A illustrates a fourth sample optical communication network according to an embodiment of the present invention during normal operations.
Figure 10B:
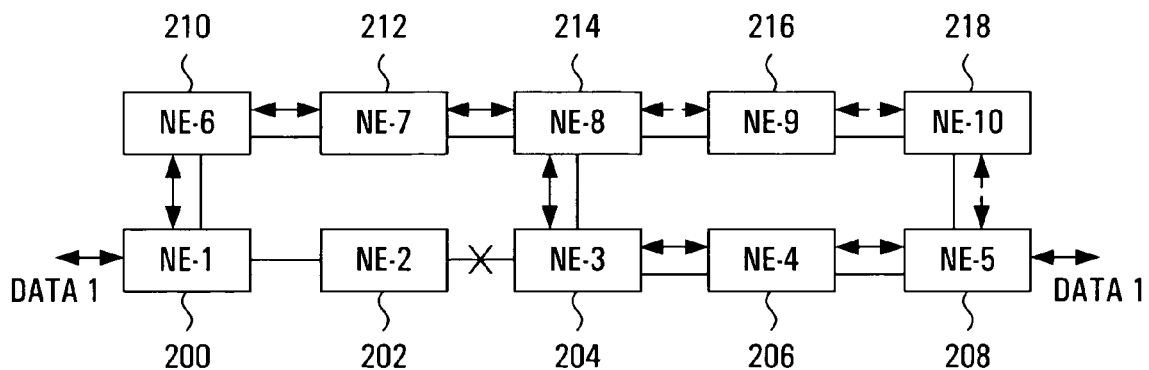
FIGS. 10B, 10C and 10D illustrate the fourth sample optical communication network of FIG. 10A during operations in which a variety of different failures are indicated.
Figure 10C:
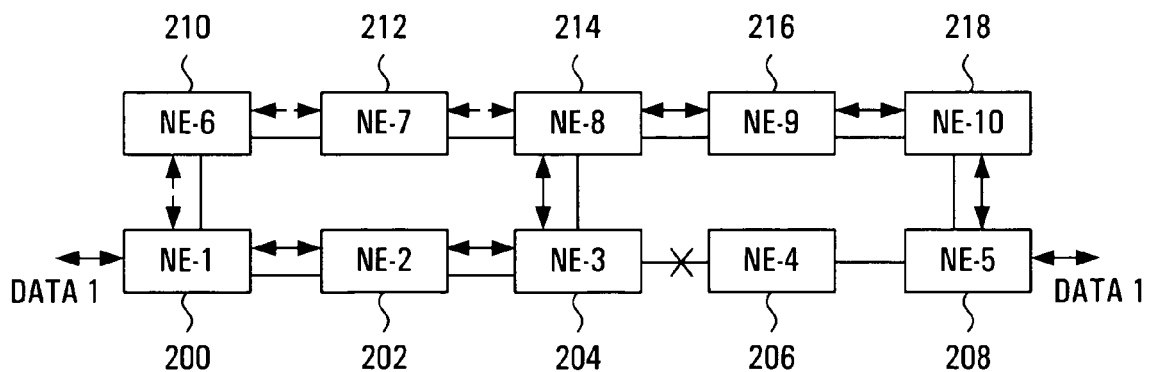
Figure 10D:
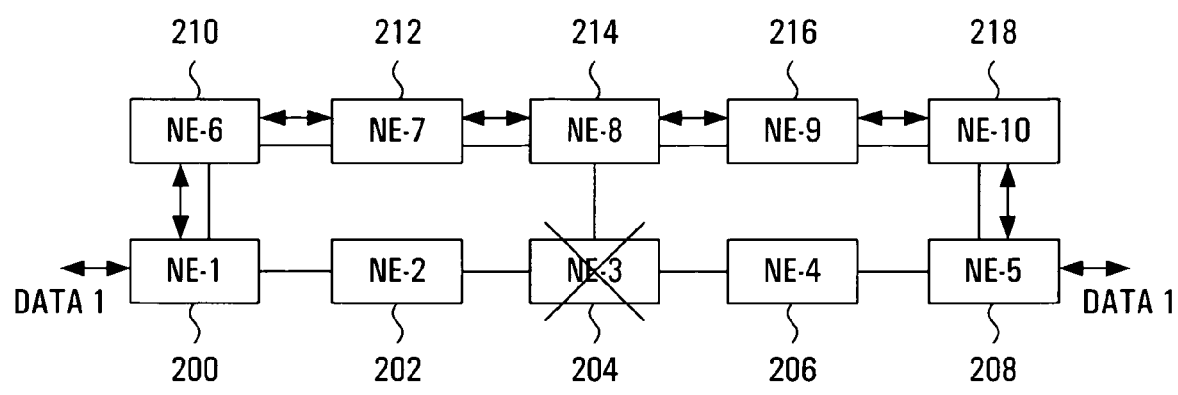

FIG. 10A illustrates the optical communication network in normal operations in which no failure is indicated in the working path. FIG. 10B illustrates the optical communication network of FIG. 10A in the case that a failure has occurred between NE 202 and NE 204, the protection path utilized in this case going around the failure while utilizing the NEs and OC links of the working path as much as possible. Thus, only the switch fabrics within NEs 200,210,212,214,204 must be reconfigured (hence 5 switching instructions within the protection switching data) and a minimum number of the reserved protection sectors within the OC links must be used. FIG. 10C illustrates the optical communication network of FIG. 10A in the case that a failure has occurred between NE 204 and NE 206. Similar to FIG. 10B, the protection path utilized in this case is going around the failure while utilizing the NEs and OC links of the working path as much as possible. Thus, only the switch fabrics within NEs 204,214,216, 218,208 must be reconfigured (hence 5 switching instructions within the protection switching data) and, similar to FIG. 10B, a minimum number of the reserved protection sectors within the OC links must be used. FIG. 10D illustrates the optical communication network of FIG. 10A in the case that a failure has occurred in NE 204. The protection path utilized in this case goes completely around the failure while utilizing none of the NEs and OC links of the working path (hence 7 switching instructions within the protection switching data).

In the above examples, the network manager of the optical communication network has attempted to utilize as much of the working path components as possible during failure situations, thus minimizing the number of protection sectors that must be used and the number of switch fabrics that must be re-configured. The implementation of preferred embodiments of the present invention allow the required flexibility for this purpose.

Although the present invention has been described herein above for the SONET standard, it should be recognized that other data traffic not defined by SONET could be utilized. One important aspect of the present invention is the ability to broadcast protection switching instructions via protection byte(s) within a path overhead within the data traffic, this ability allowing for quick and reliable switching of switch fabrics in case of failure conditions.

Persons skilled in the art will appreciate that there are yet more alternative implementations and modifications possible for implementing the present invention, and that the above implementations are only illustrations of certain embodiments of the invention. The scope of the invention, therefore, is only to be limited by the claims appended hereto.

We claim:

1. A network element arranged to be coupled within a working path of an optical network, the network element comprising:
    a plurality of ports including first and second ports arranged to be coupled to Optical Carrier (OC) links within the working path;
    a switch fabric connected to the plurality of ports and configured to couple the first and second ports such that data traffic received on one of the first and second ports is output on the other;
    a table configured to have entered into it a protection entry for assigning prior to any failure in the working path a protection path having a plurality of network elements, the protection entry including protection switching data; and
    a control unit, connected to the switch fabric, that operates to monitor for a failure within the working path and, if a failure is detected in the working path, to look-up the protection entry within the table to obtain the protection switching data and to insert the protection switching data within the data traffic for configuring the protection path;
    wherein the table is configured to have entered into it a plurality of protection entries each for assigning a respective protection path having a plurality of network elements, the plurality of protection entries each including respective protection switching data, the plurality of protection entries comprising the protection entry; and
    wherein, if another failure is detected in the working path, the control unit is adapted to look-up a looked-up protection entry, of the plurality of protection entries within the table, corresponding to the other failure, and to insert the respective protection switching data of the looked-up protection entry within the data traffic for establishing the respective protection path corresponding to the looked-up protection entry.

2. A network element according to claim 1, wherein the data traffic comprises a plurality of data units, each data unit comprising a path overhead that further comprises at least one protection byte; and
    wherein to insert the protection switching data within the data traffic, the control unit inserts the protection switching data within the at least one protection byte.

3. A network element according to claim 2, wherein each of the data units comprises a Synchronous Transport Signal Level 1 (STS-1) and the at least one protection byte comprises at least one of the Z3 and Z4 bytes defined within the path overhead of each STS-1.

4. A network element arranged to be coupled within a working path of an optical network, the network element comprising:
    a plurality of ports including first and second ports arranged to be coupled to Optical Carrier (OC) links within the working path;
    a switch fabric connected to the plurality of ports and configured to couple the first and second ports such that data traffic received on one of the first and second ports is output on the other;
    a table configured to have entered into it a protection entry for assigning prior to any failure in the working path a protection path having a plurality of network elements, the protection entry including protection switching data; and
    a control unit, connected to the switch fabric, that operates to monitor for a failure within the working path and, if a failure is detected in the working path, to look-up the protection entry within the table to obtain the protection switching data and to insert the protection switching data within the data traffic for configuring the protection path;
    wherein the protection switching data comprises a plurality of switching instructions for switch fabrics within network elements of the plurality of network elements of the protection path.

5. A network element according to claim 4, wherein the plurality of ports further includes a third port arranged to be coupled to a protection path OC link;
    wherein a switching instruction within the protection switching data dictates the reconfiguration of the switch fabric such that the first and third ports are coupled together; and
    wherein, if a failure is detected within the working path, the control unit further operates to reconfigure the switch fabric according to the corresponding switching instruction.

6. A network element arranged to be coupled within a working path of an optical network, the network element comprising:
- a plurality of ports including first and second ports arranged to be coupled to Optical Carrier (OC) links within the working path;
- a switch fabric connected to the plurality of ports and configured to couple the first and second ports such that data traffic received on one of the first and second ports is output on the other;
- a table configured to have entered into it a protection entry for assigning prior to any failure in the working path a protection path having a plurality of network elements, the protection entry including protection switching data; and
- a control unit, connected to the switch fabric, that operates to monitor for a failure within the working path and, if a failure is detected in the working path, to look-up the protection entry within the table to obtain the protection switching data and to insert the protection switching data within the data traffic for configuring the protection path;
- wherein the protection switching data within the data traffic comprises switching instructions for reconfiguring each one of the plurality of network elements of the protection path that requires reconfiguration to configure the protection path, at least one of the plurality of network elements of the protection path being a network element other than a path-terminating element of the working path.

7. A network element according to claim 6 wherein the plurality of ports are arranged to be coupled to respective OC links to form a mesh network.

8. A network element arranged to be assigned within a protection path comprising a plurality of network elements of an optical network, the plurality of the network elements comprising the network element, the network element comprising:
- a plurality of ports;
- a switch fabric connected to each of the ports; and
- a control unit, connected to the switch fabric, that operates to monitor for changes in protection switching data within data traffic received at one of the ports and, if the protection switching data has changed;
  (i) to process the protection switching data in order to determine if any switching instructions within the protection switching data relate to the network element and, if at least one of the switching instructions relate to the network element, to reconfigure the switch fabric according to the switching instruction related to the network element such that the network element is configured within the protection path; and
  (ii) send the protection switching data within the data traffic to another network element of the plurality of network elements of the protection path even if there are switching instructions within the protection switching data that relate to the network element.

9. A network element according to claim 8, wherein the data traffic comprises a plurality of data units, each data unit comprising a path overhead that further comprises at least one protection byte; and
- wherein the protection switching data within the data traffic is located within at least one protection byte.

10. A network element according to claim 9, wherein each of the data units comprises a Synchronous Transport Signal Level 1 (STS-1) and the at least one protection byte comprises at least one of the Z3 and Z4 bytes defined within the path of the overhead of each STS-1.

11. A network element according to claim 8, wherein the plurality of ports include first and second ports arranged to be coupled to Optical Carrier (OC) links within a working path;
- wherein the switch fabric is configured to couple the first and second ports such that data traffic received on one of the first and second ports is output on the other; and
- wherein the control unit further operates to monitor for a failure within the working path and, if a failure is detected in the working path, to determine protection switching data corresponding to the failure and to insert the protection switching data within the data traffic being output from at least one of the first and second ports.

12. A network element according to claim 11 further comprising a table that includes at least one protection entry;
- wherein to determine protection switching data corresponding to the failure, the control unit operates to look up a protection entry within the table corresponding to the failure within the working path, the protection entry comprising the protection switching data.

13. A network element according to claim 8 wherein the protection switching data is generated by a network element within a working path associated with the protection path and is adapted to be transported to network elements of the protection path, at least one of the network elements of the protection path being a network element other than a path-terminating element of the working path.

14. A method for establishing an optical communication network of network elements and Optical Carrier (OC) links, the method comprising:
- configuring a working path for data traffic between a first path-terminating network element and a second path-terminating network element via a first set of the OC links; and
- prior to any failure in the working path, assigning at least one protection path for data traffic between the first path-terminating network element and the second path-terminating network element via a second set of the OC links, the assigning at least one protection path comprising:
  inserting protection entries into tables within network elements that can detect failures within the working path, the protection entries comprising protection switching data that indicates switch fabric modifications necessary to configure the protection path between the first path-terminating network element and the second path-terminating network element;
- wherein for a protection path of the at least one protection path the protection path and the working path collectively comprise the first path-terminating network element, the second path-terminating network element, and at least one other network element;
- wherein the configuring a working path for data traffic comprises configuring switch fabrics within a plurality of the network elements to transmit the data traffic through the working path.

15. A method according to claim 14, wherein the configuring a working path for data traffic further comprises reserving bandwidth for the data traffic to traverse the first set of OC links.

16. A method according to claim 14, wherein the assigning at least one protection path for data traffic further comprises reserving bandwidth for the data traffic to traverse the second set of OC links.

17. A method according to claim 14 applied to a mesh network.

18. A method for establishing an optical communication network of network elements and Optical Carrier (OC) links, the method comprising:

configuring a working path for data traffic between a first path-terminating network element and a second path-terminating network element via a first set of the OC links; and prior to any failure in the working path, assigning at least one protection path for data traffic between the first path-terminating network element and the second path-terminating network element via a second set of the OC links, the assigning at least one protection path comprising:

inserting protection entries into tables within network elements that can detect failures within the working path, the protection entries comprising protection switching data that indicates switch fabric modifications necessary to configure the protection path between the first path-terminating network element and the second path-terminating network element;

wherein for a protection path of the at least one protection path the protection path and the working path collectively comprise the first path-terminating network element, the second path-terminating network element, and at least one other network element:

wherein the assigning at least one protection path for data traffic comprises assigning a plurality of protection paths for data traffic from the first path-terminating network element to the second path-terminating network element via a plurality of corresponding sets of OC links.

19. A method for establishing an optical communication network of network elements and Optical Carrier (OC) links, the method comprising:

configuring a working path for data traffic between a first path-terminating network element and a second path-terminating network element via a first set of the OC links; and prior to any failure in the working path, assigning at least one protection path for data traffic between the first path-terminating network element and the second path-terminating network element via a second set of the OC links, the assigning at least one protection path comprising:

inserting protection entries into tables within network elements that can detect failures within the working path, the protection entries comprising protection switching data that indicates switch fabric modifications necessary to configure the protection path between the first path-terminating network element and the second path-terminating network element;

wherein for a protection path of the at least one protection path the protection path and the working path collectively comprise the first path-terminating network element, the second path-terminating network element, and at least one other network element;

wherein the protection switching data also indicates switch fabric modifications to network elements of the second set of OC links and network elements.

20. A method for establishing an optical communication network of network elements and Optical Carrier (OC) links, the method comprising:

configuring a working path for data traffic between a first path-terminating network element and a second path-terminating network element via a first set of the OC links; and prior to any failure in the working path, assigning at least one protection path for data traffic between the first path-terminating network element and the second path-terminating network element via a second set of the OC links, the assigning at least one protection path comprising:

inserting protection entries into tables within network elements that can detect failures within the working path, the protection entries comprising protection switching data that indicates switch fabric modifications necessary to configure the protection path between the first path-terminating network element and the second path-terminating network element comprising:

for each of at least one OC link from at least one of the first set and the second set, reserving a respective bandwidth for the data traffic and reserving at least one other respective bandwidth each for the other data traffic selected from a group comprising data traffic on an other working path, data traffic on a protection path other than the at least one protection path, unassigned data traffic, and unprotected data traffic.

21. A method for establishing an optical communication network of network elements and Optical Carrier (OC) links, the method comprising:

configuring a working path for data traffic between a first path-terminating network element and a second path-terminating network element via a first set of the OC links; and prior to any failure in the working path, assigning at least one protection path for data traffic between the first path-terminating network element and the second path-terminating network element via a second set of the OC links, the assigning at least one protection path comprising:

inserting protection entries into tables within network elements that can detect failures within the working path, the protection entries comprising protection switching data that indicates switch fabric modifications necessary to configure the protection path between the first path-terminating network element and the second path-terminating network element wherein the first set comprises a plurality of OC links, the method comprising:

for each OC link of the plurality of OC link reserving a respective bandwidth for data traffic, the respective bandwidth reserved on one of the plurality of OC links being different than the respective bandwidth reserved on another one of the plurality of OC links.

22. A method for establishing an optical communication network of network elements and Optical Carrier (OC) links, the method comprising:

configuring a working path for data traffic between a first path-terminating network element and a second path-terminating network element via a first set of the OC links; and prior to any failure in the working path, assigning at least one protection path for data traffic between the first path-terminating network element and the second path-terminating network element via a second set of the OC links, the assigning at least one protection path comprising:

inserting protection entries into tables within network elements that can detect failures within the working path, the protection entries comprising protection switching data that indicates switch fabric modifications necessary to configure the protection path between the first path-terminating network element and the second path-terminating network element;

wherein each one of the first and second path-terminating network elements comprises a plurality of ports including a first port arranged to be coupled to an OC link of the first set and including a second port arranged to be coupled to an OC link of the second set, and a switch matrix connected to the plurality of ports, the method comprising:

monitoring for a failure within the working path and, if a failure is detected in the working path, to determine protection switching data corresponding to the failure, and if a switching instruction within the protection switching data dictates the reconfiguration of the switch fabric such that the protection path is configured the control unit further operates to reconfigure the switch fabric to couple the first port and the second port.

23. A method for configuring an assigned protection path within an optical network during a failure within a working path, the assigned protection path and the working path collectively comprising at least three network elements of the optical network, and the method comprising:

monitoring for a failure indication within the working path; and if a failure indication is detected within the working path: looking up a protection entry within a table corresponding to the failure indication to determine protection switching data corresponding to the failure;

transporting the protection switching data within the data traffic to at least one network element of the protection path; and processing the protection switching data at each of the at least one network element that requires reconfiguration such that their corresponding switch fabrics are reconfigured;

wherein the protection switching data comprises a plurality of switching instructions for the network elements of the protection path that require switching.

24. A method according to claim 23, wherein the data traffic comprises a plurality of data units, each data unit comprising a path overhead that further comprises at least one protection byte; and wherein the transporting the protection switching data within the data traffic comprises inserting the protection switching data within the at least one protection byte of the path overhead and forwarding the data traffic.

25. A method according to claim 23, wherein each of the data units comprises a Synchronous Transport Signal Level 1 (STS-1) and the at least one protection byte comprises at least one of the Z3 and Z4 bytes defined within the path overhead of each STS-1.

26. A method according to claim 23 wherein the at least one network element comprises a plurality of network elements.

27. An optical communication network of network elements coupled together with Optical Carrier (OC) links, the optical communication network comprising:

a working path comprising a first set of at least one OC link and network elements that are configured to transmit data traffic between first and second path-terminating network elements; and at least one protection path comprising a second set of at least one OC link and network elements that are assigned prior to any failure within the working path to transmit data traffic between the first and second path-terminating network elements if the failure is detected in the working path;

wherein for each network element of the working path, a table within the network element comprises a protection entry that dictates switching instructions that must be applied to the network elements of the protection path to configure the protection path;

wherein, if a failure occurs within the working path, at least one of the network elements of the first set operates to detect the failure, to determine protection switching data by looking up the corresponding protection entry within its table, and to insert the determined protection switching data including its switching instructions into the data traffic.

28. A network according to claim 27, wherein the data traffic comprises a plurality of data units, each data unit comprising a path overhead that further comprises at least one protection byte; and wherein to insert the determined protection switching data into the data traffic, the particular network element operates to insert the protection switching data within the at least one protection byte.

29. A network according to claim 28, wherein each of the data units comprises a Synchronous Transport Signal Level 1 (STS-1) and the at least one protection byte comprises at least one of the Z3 and Z4 bytes defined within the path overhead of each STS-1.

30. A network according to claim 27, wherein each of the network elements within the first set comprises a switch fabric configured to transmit the data traffic through the working path.

31. An optical communication network of network elements coupled together with Optical Carrier (OC) links, the optical communication network comprising:

a working path comprising a first set of at least one OC link and network elements that are configured to transmit data traffic between first and second path-terminating network elements; and at least one protection path comprising a second set of at least one OC link and network elements that are assigned prior to any failure within the working path to transmit data traffic between the first and second path-terminating network elements if the failure is detected in the working path;

wherein for each network element of the working path, a table within the network element comprises a protection entry that dictates switching instructions that must be applied to the network elements of the protection path to configure the protection path;

wherein each of the OC links within the first set comprises reserved bandwidth for the data traffic to traverse the working path.

32. An optical network according to claim 31, wherein the network elements are coupled together with the OC links to form a mesh network.

33. An optical network according to claim 31 comprising means for assigning the protection path by adding protection entries to the tables.

34. An optical communication network according to claim 33 wherein the protection path comprises only a portion of an overall data path followed by the data traffic.

35. An optical communication network of network elements coupled together with Optical Carrier (OC) links, the optical communication network comprising:

a working path comprising a first set of at least one OC link and network elements that are configured to transmit data traffic between first and second path-terminating network elements; and at least one protection path comprising a second set of at least one OC link and network elements that are assigned prior to any failure within the working path to transmit data traffic between the first and second path-terminating network elements if the failure is detected in the working path;

wherein for each network element of the working path, a table within the network element comprises a protection entry that dictates switching instructions that must be applied to the network elements of the protection path to configure the protection path;

wherein each of the OC links of the second set comprises reserved bandwidth for the data traffic to traverse the protection path.

36. An optical communication network of network elements coupled together with Optical Carrier (OC) links, the optical communication network comprising:

a working path comprising a first set of at least one OC link and network elements that are configured to transmit data traffic between first and second path-terminating network elements; and at least one protection path comprising a second set of at least one OC link and network elements that are assigned prior to any failure within the working path to transmit data traffic between the first and second path-terminating network elements if the failure is detected in the working path;

wherein for each network element of the working path, a table within the network element comprises a protection entry that dictates switching instructions that must be applied to the network elements of the protection path to configure the protection path;

wherein at least one of the network elements of the first set is within the second set.

37. An optical communication network of network elements coupled together with Optical Carrier (OC) links, the optical communication network comprising:

a working path comprising a first set of at least one OC link and network elements that are configured to transmit data traffic between first and second path-terminating network elements; and at least one protection path comprising a second set of at least one OC link and network elements that are assigned prior to any failure within the working path to transmit data traffic between the first and second path-terminating network elements if the failure is detected in the working path;

wherein for each network element of the working path, a table within the network element comprises a protection entry that dictates switching instructions that must be applied to the network elements of the protection path to configure the protection path;

wherein at least some of the instructions are switching instructions that must be applied to the first and second path-terminating network elements.

38. An optical communication network of network elements coupled together with Optical Carrier (OC) links, the optical communication network comprising:

a working path comprising a first set of at least one OC link and network elements that are configured to transmit data traffic between first and second path-terminating network elements; and at least one protection path comprising a second set of at least one OC link and network elements that are assigned prior to any failure within the working path to transmit data traffic between the first and second path-terminating network elements if the failure is detected in the working path;

wherein for each network element of the working path, a table within the network element comprises a protection entry that dictates switching instructions that must be applied to the network elements of the protection path to configure the protection path;

wherein the first set and the second set from each of the at least one protection path collectively comprises at least one OC link having a respective bandwidth reserved for the data traffic and at least one other respective bandwidth each reserved for respective other data traffic selected from a group comprising data traffic on a working path, data traffic on a protection path, unassigned data traffic, and unprotected data traffic.

39. An optical communication network according to claim 38 wherein the first set comprises a plurality of OC links each having a bandwidth reservation comprising the respective reserved bandwidth and the at least one other respective bandwidth, the bandwidth reservation of one of the plurality of OC links being different than the bandwidth reservation another one of the plurality of OC links.

40. An optical communication network according to claim 38 wherein for at least one OC link the at least one other respective bandwidth comprises a bandwidth for the data traffic on an other working path.

41. An optical communication network according to claim 38 wherein for an OC link of the at least one OC link the at least one other respective bandwidth comprises a bandwidth for the data traffic on a protection path other than the at least one protection path.

42. An optical communication network according to claim 38 wherein for an OC link of the at least one OC link the at least one other respective bandwidth comprises a bandwidth for the unassigned data traffic.

43. An optical communication network according to claim 38 wherein for an OC link of the at least one OC link the at least one other respective bandwidth comprises a bandwidth for the unprotected data traffic.

44. An optical communication network of network elements coupled together with Optical Carrier (OC) links, the optical communication network comprising:

a working path comprising a first set of at least one OC link and network elements that are configured to transmit data traffic between first and second path-terminating network elements; and at least one protection path comprising a second set of at least one OC link and network elements that are assigned prior to any failure within the working path to transmit data traffic between the first and second path-terminating network elements if the failure is detected in the working path;

wherein for each network element of the working path, a table within the network element comprises a protection entry that dictates switching instructions that must be applied to the network elements of the protection path to configure the protection path;

wherein each one of the first and second path-terminating network elements of the working path comprises:

a plurality of ports including a first port arranged to be coupled to an OC link of the first set and including a second port arranged to be coupled to an OC link of the second set;

a switch fabric connected to the plurality of ports; and a control unit, connected to the switch fabric, that operates to monitor for a failure within the working path and, if a failure is detected in the working path, to determine protection switching data corresponding to the failure, and if a switching instruction within the protection switching data dictates the reconfiguration of the switch fabric such that a protection path of the at least one protection path is configured the control unit further operates to reconfigure the switch fabric for coupling the first port and the second port.

* * * * *

UNITED STATES PATENT AND TRADEMARK OFFICE
CERTIFICATE OF CORRECTION

PATENT NO. : 7,593,322 B2  Page 1 of 1
APPLICATION NO. : 11/038206
DATED : September 22, 2009
INVENTOR(S) : DeBoer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this

Twenty-first Day of September, 2010

David J. Kappos
*Director of the United States Patent and Trademark Office*